US007991100B2

(12) United States Patent
Schwoerer et al.

(10) Patent No.: US 7,991,100 B2
(45) Date of Patent: Aug. 2, 2011

(54) METHOD FOR THE SYNCHRONIZATION OF A RADIO RECEIVER, AND ADAPTED RECEIVER FOR THE IMPLEMENTATION OF SAID METHOD

(75) Inventors: Jean Schwoerer, Grenoble (FR); David Derrien, Nantes (FR); Benoît Miscopein, Grenoble (FR); Eric Batut, Saint-Martin-Gimois (FR)

(73) Assignee: France Telecom, Paris (FR)

( * ) Notice: Subject to any disclaimer, the term of this patent is extended or adjusted under 35 U.S.C. 154(b) by 1050 days.

(21) Appl. No.: 11/666,480

(22) PCT Filed: Oct. 25, 2005

(86) PCT No.: PCT/FR2005/002650
§ 371 (c)(1),
(2), (4) Date: Jul. 16, 2007

(87) PCT Pub. No.: WO2006/045943
PCT Pub. Date: May 4, 2006

(65) Prior Publication Data
US 2008/0095288 A1 Apr. 24, 2008

(30) Foreign Application Priority Data
Oct. 27, 2004 (FR) ...................... 04 11468

(51) Int. Cl.
*H04L 7/02* (2006.01)
*H04B 1/00* (2006.01)
*H04J 3/16* (2006.01)
*G06F 3/00* (2006.01)

(52) U.S. Cl. ........... 375/359; 375/150; 370/466; 710/61
(58) Field of Classification Search ................ 375/359, 375/150; 370/466
See application file for complete search history.

(56) References Cited

U.S. PATENT DOCUMENTS

| 3,767,901 | A | * | 10/1973 | Black et al. ............... 318/568.11 |
| 3,769,587 | A | * | 10/1973 | Matsuo et al. ................ 375/376 |
| 4,034,720 | A | * | 7/1977 | Noguchi et al. ............... 123/275 |
| 4,816,989 | A | * | 3/1989 | Finn et al. ..................... 709/248 |

(Continued)

OTHER PUBLICATIONS

Cassioli et al., "A Statistical Model for the UWB Indoor Channel," Vehicular Technology Conference, 2001, VTC 2001 Spring, IEEE VTS 53rd, vol. 2, pp. 1159-1163 (2001).

(Continued)

*Primary Examiner* — Shuwang Liu
*Assistant Examiner* — Sarah Hassan
(74) *Attorney, Agent, or Firm* — Drinker Biddle & Reath LLP (57) ABSTRACT

A method for the synchronization of a radio receiver, comprising an estimation of the moment when a pulse (11, 17) is received (11, 17), performed from the moment when a previous pulse was received. The estimated moment is compared with the real moment when the pulse (21, 27) is received in order to validate an association of pulses with values of a code recorded in the receiver (31, 37). A moment for the beginning of transmission of a symbol is thus deduced, enabling the receiver to be synchronized in relation to the transmitted radio pulse sequence.

18 Claims, 3 Drawing Sheets

U.S. PATENT DOCUMENTS

| | | | | | |
|---|---|---|---|---|---|
| 5,056,084 | A | * | 10/1991 | Le Corre | 370/466 |
| 5,125,089 | A | * | 6/1992 | McCambridge | 710/61 |
| 5,832,035 | A | | 11/1998 | Fullerton | |
| 6,556,621 | B1 | * | 4/2003 | Richards et al. | 375/150 |
| 2004/0190597 | A1 | * | 9/2004 | Cowie et al. | 375/138 |

OTHER PUBLICATIONS

Cassioli et al., "Performance of Low-Complexity Rake Reception in a Realistic UWB Channel,"; Communications, 2002, ICC 2002, IEEE International Conference on, vol. 2, pp. 763-767 (2002).

Fleming et al., "Rapid Acquisition for Ultra-Wideband Localizers," Ultra Wideband Systems and Technologies, 2002, Digest of Papers, 2002 IEEE Conference on, pp. 245-249 (2002).

Price et al., "Communication Technique for Multipath Channels," Proceedings of the IRE, vol. 46, pp. 555-570 (Mar. 1958).

Scholtz, "Multiple Access With Time-Hopping Impulse Modulation," Proceedings of the IEEE Military Communications Conference, (MILCOM 93), vol. 2, pp. 447--450, Bedford, MA (Oct. 1993).

Win et al., "Impulse Radio: How It Works," Communications Letters, IEEE, vol. 2(2), pp. 36-38 (Feb. 1998).

* cited by examiner

METHOD FOR THE SYNCHRONIZATION OF A RADIO RECEIVER, AND ADAPTED RECEIVER FOR THE IMPLEMENTATION OF SAID METHOD

CROSS-REFERENCE TO RELATED APPLICATIONS

This application is the U.S. national phase of the International Patent Application No. PCT/FR2005/002650 filed Oct. 25, 2005, which claims the benefit of French Application No. 04 11468 filed Oct. 27, 2004, the entire content of which is incorporated herein by reference.

BACKGROUND OF THE INVENTION

The present invention relates to a method of synchronizing a radio receiver, and a receiver suitable for implementing such a method. It also relates to a transmission method comprising such a synchronization of the receiver, and a suitable radio transmitter.

Pulse radio transmission is a recent remote communication technique, used mainly for short range applications. The transmission distance is typically less than 100 meters. It can cover transmissions at very high rate, at least 500 megabits/second for example, used in various circumstances such as, in particular, a USB2 port, a video data transmission between a DVD player and a projector, or even a data broadcast from an information station made available to the public. It can also cover transmissions at relatively low rate, for example for linking sensors to a monitoring or data acquisition local area network. In this case, the pulse transmission is particularly advantageous because of its low energy consumption.

In a pulse radio transmission, a predetermined transmission duration is assigned to each symbol. The term "symbol" is used to mean a modulation state used in coding data intended for transmission. For a 2-PPM (standing for "Pulse Position Modulation") transmission mode, a symbol corresponds to one transmitted bit, and for a 4-PPM mode, a symbol corresponds to two transmitted bits. The symbol transmission duration is divided into a fixed number of first-level time slots, called frames. Furthermore, each frame is itself divided into second-level time slots, called slots. As an example, the transmission duration of a symbol (denoted $T_S$) is 1280 ns (ns standing for nanoseconds), the duration of a frame (denoted $T_F$) is 160 ns and that of a slot (denoted $T_C$, standing for "chip" duration) is 20 ns. In this case, one symbol corresponds to eight frames transmitted in succession, and each frame in turn corresponds to eight slots.

A symbol is transmitted in the form of pulses located within certain slots of a transmission sequence. It is coded via a delay of each pulse relative to the start of the corresponding slot, called state delay. To resume the example mentioned above, a pulse duration of around 1 ns and a state delay also of around 1 ns are suitable for 20 ns slots. Because of the very short duration of the pulses, the transmitted radio energy is distributed over a very wide range of frequencies, of the order of several gigahertz. For this reason, the pulse radio transmission mode is designated UWB, standing for "Ultra-Wide Band".

Figure 1:
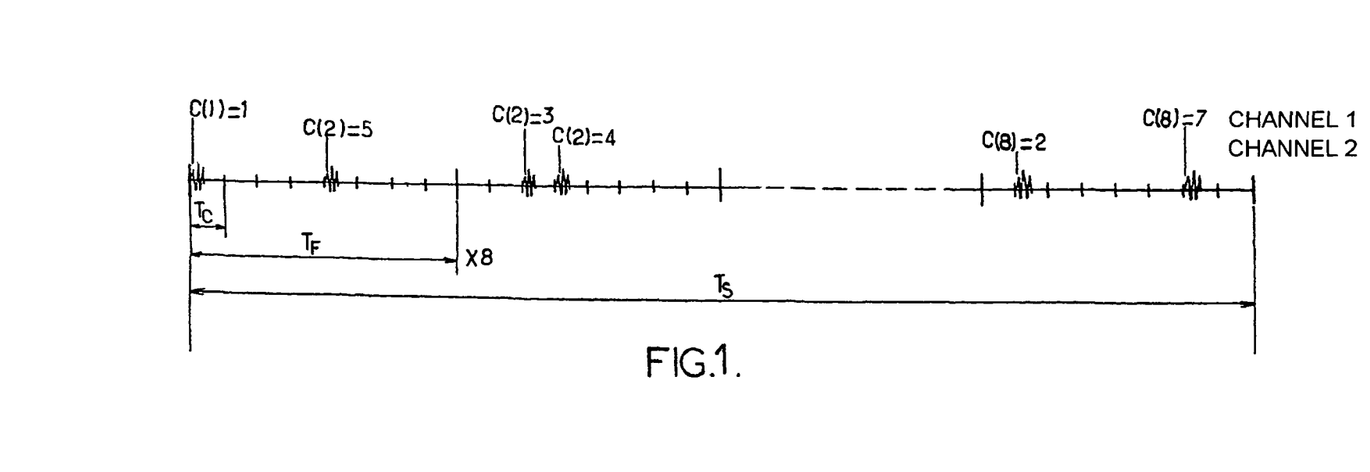
FIG. 1, already described, illustrates the structure of a pulse radio transmission sequence.

Within the transmission sequence of each symbol, different slot selections for each frame make it possible to obtain multiple access. In other words, several transmission channels are thus distinguished, which can be used simultaneously to transmit a variety of data to different receivers. The ordered series of position numbers, within successive frames, of the slots that contain a meaningful pulse to transmit a symbol via this channel constitutes a characteristic code of the channel. This code is therefore formed by a pseudo-random series of N values, N being the number of frames within the transmission sequence of a symbol. Each value is an integer number between 1 and the number of slots per frame. FIG. 1 illustrates a transmission sequence corresponding to one and the same symbol transmitted simultaneously by two separate channels. In the case of the example illustrated, the codes used for each channel are respectively 1, 3, . . . , 7 and 5, 4, . . . , 2.

Changing slot between two successive frames for one and the same channel, according to the code of the latter, is called time hopping. In addition to the multiplexing function which has been described, time hopping makes it possible to introduce redundancy, in order to improve the transmission quality. This redundancy corresponds to the multiplicity of the frames indicated by the code and which contain a particular symbol.

Furthermore, time hopping makes it possible to break up the periodicity of the transmitted radio signal. The energy of the radio signal is then distributed more continuously over all the frequency spectrum.

To identify a symbol transmitted by a transmitter to a predetermined receiver, the receiver must be synchronized relative to the transmitter. Once the synchronization is obtained, a symbol correlation pattern is generated within the receiver at the same time as the radio signal is received. This pattern is generated from the code of the channel used, and makes it possible to isolate, within the received signal, the pulses transmitted to the receiver. For this, the synchronization of the receiver must be performed with an accuracy of a few tens of picoseconds, typically.

Usually, the synchronization of the receiver is sought by implementing a rolling correlation between the pattern and the received radio signal. For this, correlation ratios between a sequence of the received signal and the pattern are calculated, by applying variable delay values to the pattern. The delay value associated with the highest correlation ratio obtained in this way corresponds to the synchronization. Given that the accuracy of the synchronization is then proportional to the number of delay values for which a correlation ratio is calculated, a considerable number of operations must be carried out within the receiver.

Such a synchronization method can therefore take a particularly long time, especially for low-rate transmissions. Now, the data that is contained in the signals received before the receiver is synchronized cannot be decoded. The result of this is that a large quantity of transmitted useful data is lost when setting up a new pulse radio connection.

Furthermore, the method of synchronization by rolling correlation requires the receiver to have major calculation means. In particular, several computer assemblies are usually arranged in parallel within the receiver, to reduce the time it takes to search for synchronization. The result is a complexity, a production cost and an energy consumption of the receiver that are not compatible with certain uses considered for pulse radio transmission.

Various refinements of synchronization by rolling correlation have been recently introduced, in order to reduce the duration of this operation. These refinements provide a faster convergence towards the value of the delay applied to the pattern which corresponds to the maximum of the correlation ratio. Despite these refinements, the synchronization of the receiver remains a lengthy and detrimental step.

Finally, synchronization by rolling correlation is incompatible with a receiver operating by energy detection. In practice, the amplitude of the radio signal must be identified by the receiver at each moment, even for very low signal levels, in order to calculate the correlation ratios between this amplitude and the correlation pattern.

SUMMARY OF THE INVENTION

One aim of the present invention is therefore, in the context of pulse radio transmission, to synchronize a receiver quickly and without requiring major calculation means within the receiver.

To this end, the invention proposes a method of synchronizing a radio receiver suitable for receiving coded symbols in the form of radio pulses, each transmitted in a predetermined time slot within a respective frame, said slot being determined by a value selected from a set of ordered values forming a code stored in the receiver, the method comprising the following steps, performed within the receiver:
- a—detecting received pulses;
- b—storing moments of reception of said pulses;
- c—associating a first value selected from the code with a first received pulse;
- d—selecting a second value from the code;
- e—estimating at least one moment of reception by combining the moment of reception stored for said first received pulse with said first and second selected code values;
- f—if the estimated moment matches the moment of reception stored for a second received pulse, validating the associations of said first and second code values with said first and second received pulses,
  otherwise repeating steps c to f by varying at least one of said first and second selected code values; and
- g—deducing, from at least one of the values of the code whose selection has been validated, a moment of transmission start for a symbol.

Thus, in a synchronization method according to the invention, the quantity of calculations performed within the receiver is not a priori fixed, but the calculations are continued until the synchronization is found. In other words, predefined calculation sequences are no longer carried out systematically, but only a minimal quantity of calculations is carried out, which is adapted according to the received radio signal. The result is a significant reduction in the average calculation time needed to synchronize the receiver relative to the radio signal. Far less of the transmitted useful data is then lost while setting up a new radio connection.

The reduction in the average quantity of calculations needed to synchronize the receiver also makes it possible to simplify the computation means with which the receiver is equipped. Less complex and more lightweight receivers, having a lower energy consumption, can therefore be used.

One method of synchronization according to the invention is compatible with operation of the receiver by energy detection. Step a can then comprise the following substeps:
- a1—extracting an envelope of a received radio signal;
- a2—comparing an amplitude of the extracted envelope with a detection threshold stored in the receiver; and
- a3—if said amplitude exceeds the detection threshold, identifying the radio signal with a received pulse.

Circuit modules already developed to perform such radio detection operations can then be used again to equip a receiver suited to the invention. Such re-use of existing circuit modules helps to reduce the design cost of the receiver.

According to a first improvement of the invention, the detection threshold can be adjusted so as to detect, during a duration of transmission of two successive symbols, at least as many pulses as a predetermined fraction of the number of values contained in the code. This fraction can be set, for example, at half the number of values contained in the code. Enough pulses are thus detected by the receiver, for which a match can be verified with moments of reception estimated from code values. The possibility of a pulse that is not detected by the receiver preventing the synchronization from being achieved is then reduced. In the jargon of those skilled in the art, the synchronization method is said to be more "robust".

According to a second improvement of the invention, a series of matches is sought, between the moments estimated from the code on the one hand, and the moments of reception of at least three pulses on the other hand. The synchronization that is found is then confirmed by several matches, so that the risk of resulting in an erroneous synchronization because of chance coincidences or noise pulses is reduced. The synchronization obtained is therefore particularly reliable. For this, the method also comprises the following steps, executed after the selections of m code values have been validated, m being an integer number greater than or equal to 2:
- d'—selecting an (m+1)th value from the code;
- e'—estimating at least one moment of reception by combining the moment of reception stored for the mth received pulse with the mth and (m+1)th selected code values; and
- f'—if the estimated moment matches the moment of reception stored for an (m+1)th received pulse, validating the association of the (m+1)th code value with the (m+1)th received pulse,
  otherwise repeating steps d' to f' by varying the (m+1)th value selected of the code.

The method can be continued recurrently to obtain series of selected and validated code values. It is stopped when enough code values have been associated with received pulses. The synchronization of the receiver is then determined with sufficient certainty. For example, the method can be continued until a series of validations is obtained that corresponds to at least half the values contained in the code.

The invention also proposes a radio receiver suitable for implementing a synchronization method as described previously.

It also proposes a radio transmission method comprising the following steps:
- coding of the symbols in the form of pulses distributed within respective frames, each pulse being transmitted in a slot of the corresponding frame determined by a value of a code stored in a radio transmitter and in at least one radio receiver;
- transmission of the pulses by radio channel; and
- synchronization of at least one receiver by using a method as described previously.

The invention also proposes a radio transmitter suitable for implementing such a transmission method.

It also proposes a system of radio transmission by pulses comprising a transmitter and a receiver as described previously.

It finally proposes a synchronization device for a radio receiver that is suitable for receiving symbols coded in the form of radio pulses, each transmitted in a predetermined time slot within a respective frame, this slot being determined by a value selected from a set of ordered values forming a code stored in the receiver. Such a synchronization device comprises:
- a—means for storing moments of reception of pulses;
- b—means for selecting values from the code;

c—means for calculating at least one second moment for reception from first and second selected code values and a first moment of reception stored for a first received pulse;

d—means for validating associations of first and second selected code values with first and second received pulses, organized so as to be activated if a second calculated moment of reception matches the moment of reception stored for the second received pulse; and e—means for determining a moment of transmission start for a symbol, suitable for determining said start moment from at least one of the code values whose selection has been validated.

DETAILED DESCRIPTION OF THE INVENTION

The invention will now be described in detail for a pulse radio transmission mode according to FIG. 1. The successive values of the code are denoted c(i), with i=1, 2, . . . , 8. Consequently, for the first example considered in FIG. 1: c(1)=1, c(2)=3, c(8)=7. Furthermore, in this example, the number of pulses used to code a symbol is equal to the length of the code.

The synchronization method comprises two tasks executed in parallel. The first task consists in detecting pulses in the received radio signal, and in storing the moment of reception of each pulse detected. It corresponds to steps a and b introduced above. The second task consists in finding matches between moments of reception estimated from a first received pulse, and moments at which other pulses are received subsequently. This second task corresponds to generic steps c to f and d' to f'.

In order to obtain a synchronization of the receiver more quickly, it is advantageous to break down the second task into two separate phases. The first phase corresponds to the estimating of the moments of reception of pulses from the values of the code, and the second phase corresponds to comparing the estimated moments of reception and the real moments of reception of pulses. The first phase can be executed by a processor of the receiver without waiting for the pulses used for the comparison to be received. The second phase can then be executed as and when the pulses are received. For this, one possible implementation of the synchronization method consists in having steps c to g executed as background tasks by the processor of the receiver. The step b of the method is then repeated during interruptions of the execution of the background task, the interruptions being triggered in response to the detection of new pulses. Thus, the first phase of the second task, which can take a certain calculation and stored data manipulation time, can be started and continued independently of the state of progress of the first task. Only the execution of the second phase of the second task depends on the progress of the first task, that is, the frequency with which pulses are detected by the receiver. The time between the reception of the first detected pulse and the moment when synchronization is obtained is thus greatly reduced in most cases.

The first task of the synchronization method will now be described in connection with FIG. 2a. In a way that is already implemented in existing appliances, the radio signal is received by a detection unit of the receiver, and an envelope of the signal is extracted by carrier elimination (step 1). The amplitude of the envelope is then compared with a fixed detection threshold (step 2). Each new violation of the threshold, which occurs after a decrease in the amplitude of the envelope below the threshold, is interpreted as a new pulse received.

The moment of reception of the received pulse can be determined simply. For example, a rising edge of a specific electronic signal can be triggered for each pulse received. The moment of reception of the pulse then corresponds to the moment at which the rising edge is triggered. It is identified relative to a clock signal internal to the receiver. Other methods of determining the moment of reception of a pulse can alternatively be used, provided that they provide an accuracy compatible with the pulse radio transmission method.

The actual moments of reception of pulses, denoted $t_1$, $t_2$, $t_3$, . . . , are stored within the receiver, in a dedicated memory (steps 4-6). Such a record of the moments of reception is advantageously presented in the form of a chronologically ordered list, complemented each time a new pulse is detected. The first task, which culminates in the storage of the real moments of reception of pulses, is continued until the synchronization is definitively determined. As will be explained later, it may be advantageous to vary the pulse detection threshold used in the first task (step 3).

Figure 3:
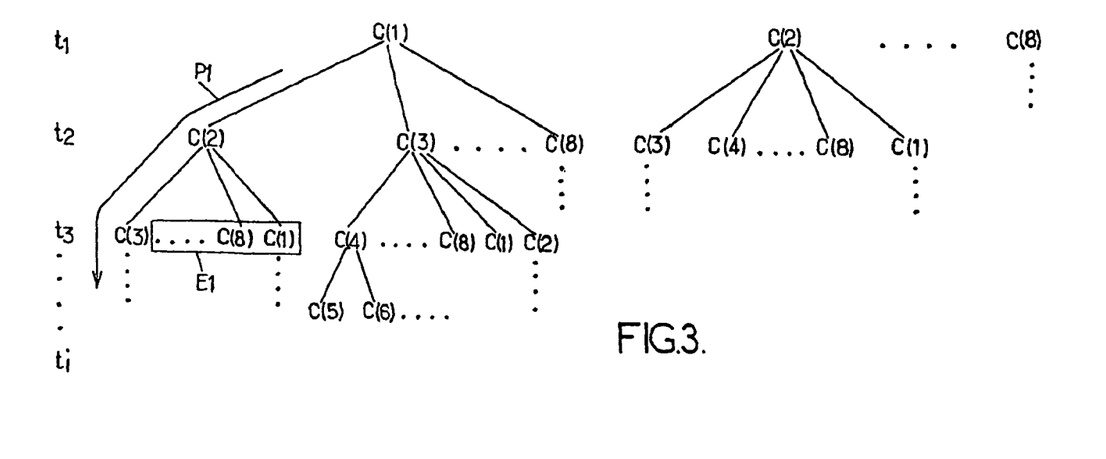
FIG. 3 represents a tree diagram of the execution of certain steps of a synchronization method according to the invention.

The second task proceeds according to a tree, as represented in FIG. 3. Each branch of the tree, or node, corresponds to an attempt to associate a value c(1), c(2), . . . , c(8) of the code with an additional received pulse. Such a branch constitutes an extension of the tree in a horizontal dimension. Furthermore, associations with values of the code tried successively for different received pulses form branches of the tree that extend in a downward direction. The path of a branch therefore corresponds to the recognition of additional pulses. Each pulse received and recognized forms a level of the tree, at which the nodes are located. Each level is identified on the left of FIG. 3 by the moment $t_1$, $t_2$, $t_3$, . . . of reception of the corresponding pulse. The size of the tree, in both horizontal and downward directions, continues to increase until the synchronization has been determined. However, the size of the tree in the downward direction is limited by the number of slots per frame, and the size of the tree in the horizontal direction is limited by the length of the code. If the synchronization is determined with the first associations tried between code values and received pulses, the tree that is constructed is small. The synchronization of the receiver is then very fast.

For each pulse received, the code values are tried in turn, for example in the order of the values in the code, until one of them can be associated with the pulse. Preferably, the first code value tried for a received pulse is the one that follows, in the order of the code, the value successfully associated with the preceding pulse for the same branch of the tree. When all the code values up to the last, that is up to c(8) in the example, have been tried unsuccessfully for a pulse, the association tests for this pulse are continued with c(1), and then with the successive code values until the one that in the code precedes the value of the node located just above in the same branch of the tree is found.

The second task begins by simultaneously considering the first two pulses received, respectively numbered 1 and 2. The attempts to associate these two pulses with two code values constitute the first two levels of the tree of FIG. 3. The first level of the tree, corresponding to $t_1$, combines all the code values worked through from c(1). The second level of the tree, which corresponds to $t_2$, combines, for each value of the first level, all the code values other than that indicated in the first level for the same branch. All the branches of the tree are thus initiated.

Associating the pulses 1 and 2 with any two code values c(j) and c(k), j and k being two integer numbers between 1 and the number of code values, consists in looking for a match between $t_2$ and the moment of reception of a second pulse estimated from $t_1$ as follows:

$$\text{if } k>j: t_{estimated}(2)=t_1+[c(k)-c(j)] \times T_c \quad (1)$$

$$\text{if } k<j: t_{estimated}(2)=t1+T_F+[c(k)-c(j)] \times T_c \quad (2)$$

Various match criteria between $t_{estimated}(2)$ and $t_2$ can be adopted. The inventors have observed that an appropriate criterion involves checking that the absolute value of the difference between $t_{estimated}(2)$ and $t_2$ is less than $T_c/4$. As a general rule, this criterion can be stated as follows: in step f, the moment of reception estimated for a second pulse from the moment of reception stored for the first pulse matches the moment of reception stored for said second pulse if an absolute value of a difference between the moments of reception estimated and stored for the second pulse is less than a predetermined fraction of the duration of a time slot. This match threshold can be equal to $T_c/4$ or $T_c/16$, for example.

Figure 2A:
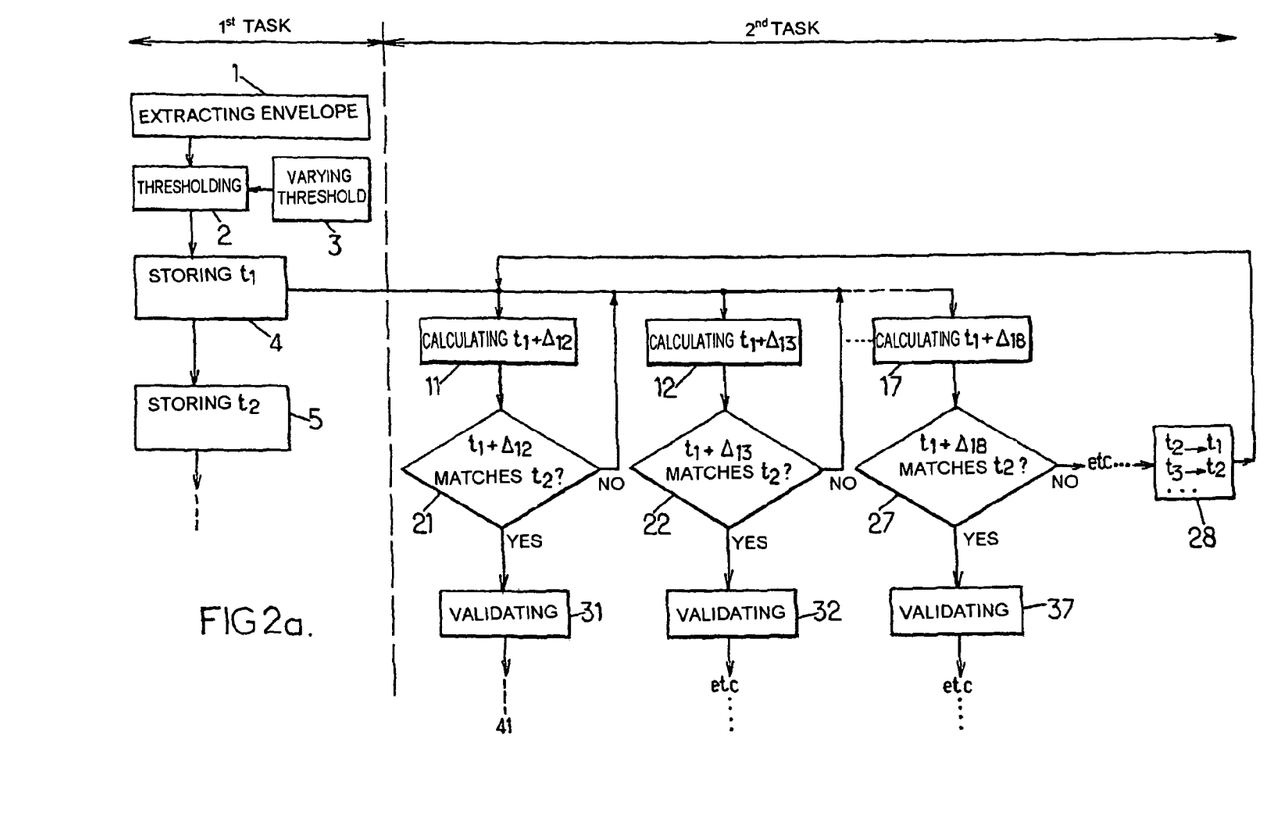
FIGS. 2a and 2b, intended to be associated, represent a block diagram of a synchronization method according to the invention.

Back to FIG. 2a, the steps referenced 11, 12, ..., 17 correspond to the calculation of $t_{estimated}(2)$ by associating c(1) with the pulse 1. For clarity in FIG. 2a, $\Delta_{jk}$ is used to designate the combination of c(j) and c(k) which is added to the moment of reception stored for a pulse in order to obtain the moment of reception estimated for a subsequent pulse. Thus:

$$\text{if } k>j: \Delta_{jk}=[c(k)-c(j)] \times T_c \quad (3)$$

$$\text{if } k<j: \Delta_{jk}=T_F+[c(k)-c(j)] \times T_c \quad (4)$$

for the association of the pulse 1 with c(1), that is j=1, and for each possibility of associating the pulse 2 with one of the code values other than c(1), the match between $t_{estimated}(2)$ and $t_2$ is evaluated in the steps referenced 21, 22, ..., 27. When a match is obtained in one of the steps 21, 22, ..., 27, the association of the pulse 1 with c(1) and of the pulse 2 with the corresponding value c(k) is validated (respective steps 31, 32, ..., 37). Otherwise, steps 11-17 are repeated, starting from the node c(2) of the first level of the tree (FIG. 3), and so on, working through all of the first and second levels of the tree.

The first and second levels of the tree of FIG. 3 correspond to the generic steps c and d introduced above. Steps 11, 12, ..., 17 correspond to the generic step e, for each combination of first and second code values. Similarly, steps 21, 22, ..., 27 and 31, 32, 37 correspond to the generic step f.

If no match is found for the received pulses 1 and 2 with a pair of code values c(j), c(k), the pulse 1 is considered to belong to the white noise and is discarded. For this, the moment $t_1$ is erased from the memory of the receiver. The received pulses 2, 3, ... are then respectively renumbered 1, 2, ... (step 28) and the second task of the method is restarted from the new pulse 1.

Immediately a validation has been obtained in one of the steps 31-37 for a pair of values c(j), c(k), the synchronization of the receiver is determined by calculating the moment $t_0$ of the start of transmission of a symbol. $t_0$ is then given by the following formula:

$$t_0=t_1-c(j) \times T_c-(j-1) \times T_F+T_S \quad (5)$$

The execution of steps 11-17 and 21-27 for different pairs of code values can be stopped immediately a moment to has thus been computed. Alternatively, in the case where a synchronization established over more than two pulses is sought, the execution of the generic steps c to f can be continued according to the first two levels of the tree. Validations may, possibly, thus be obtained for several different branches of the tree.

Since the steps 11-17 are independent of $t_2$, they can be executed before the pulse 2 has been detected by the receiver. In particular, the generic steps c to e can be repeated for several different pairs of first and second code values selected before the second pulse is detected. Step f is then executed for at least one of said pairs of first and second values after the second pulse has been detected. Obtaining a synchronization of the receiver is consequently delayed minimally by a possible delay in reception of the second pulse after the first pulse.

One method of synchronization based on just two pulses is finished immediately a validation has been obtained according to the generic step f. The description that follows concerns a continuation of the method when the synchronization is sought over more than two pulses.

Figure 2B:
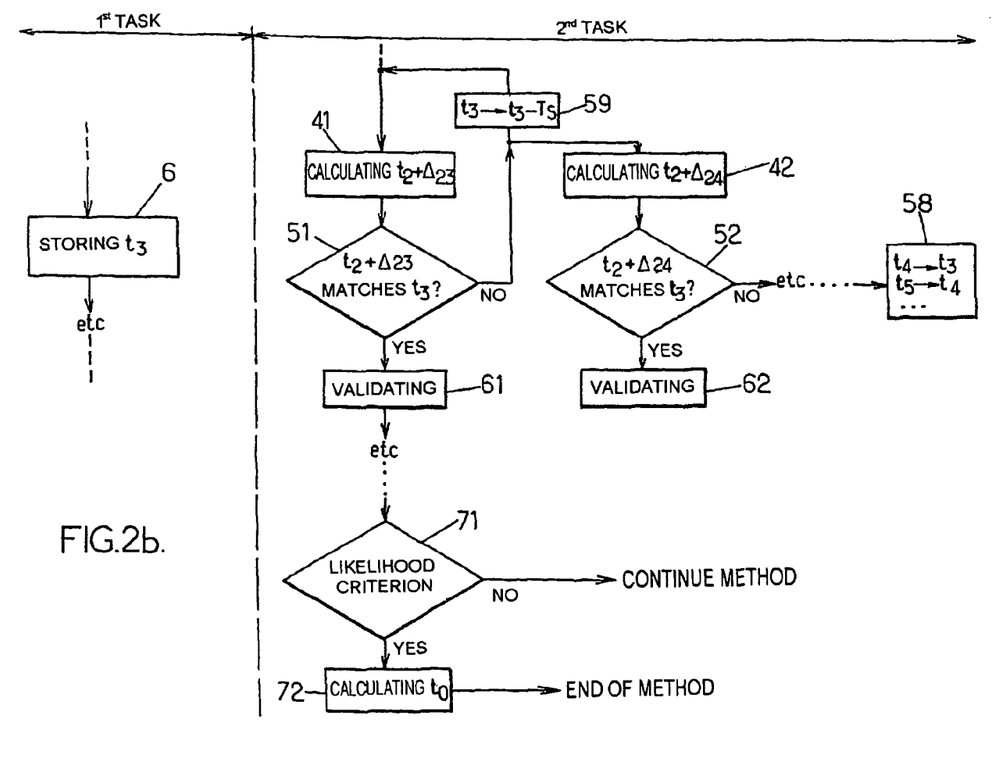

Moments of arrival of a third pulse are then estimated from $t_2$ as follows (steps 41 and 42 of FIG. 2b)

$$t_{estimated}(3)=t_2+\Delta_{mn} \quad (6)$$

In this relation, m is the number of the code value c(m) for which the association of the pulse 2 has been validated for the same branch of the tree. n is the number of the code value c(n) for which the association with the moment $t_3$ of reception of the third pulse is tried. $\Delta_{mn}$ is obtained from the formulae (3) and (4) by replacing j and k respectively with m and n.

A match between $t_{estimated}(3)$ and $t_3$ is sought in the step 51 of FIG. 3, for m=2 and n=3. The match criterion used already and described above can be re-used. In case of a match, the association of c(3) with the third pulse is validated (step 61), which corresponds to the path denoted P1 in the tree of FIG. 3. If $t_{estimated}(3)$ does not match $t_3$, the association of c(4) with the third pulse is then tried (steps 42, 52 and 62). The search for a code value that can be associated with the third pulse received is then continued by working through the portion E1 of the third level of the tree (FIG. 3). Thus, the generic steps d' to f' can be repeated for several different code values selected as third value following the first and second values. If necessary, steps d' and e', which do not require a knowledge of $t_3$, can be repeated for several different code values selected as third value before a third pulse is detected. Step f' is then executed for at least one of the values selected as third value after the third pulse has been received. In this case, any delay in the execution of the first task of the method generates only a limited delay to obtain the synchronization of the receiver, since the steps of the second task of the method are nevertheless executed during this delay.

If the third pulse cannot be associated with any code value, it is discarded and replaced with the next pulse received (step 58).

Continuing the method, a code value is associated with each pulse received that is not ruled out. Nevertheless, it is possible that no pulse received can thus be associated with a given value of the code. According to one refinement of the invention, the generic steps d' to f' are then repeated by selecting a code value for which no association has been validated, and by searching for a match between the estimated moment of reception and a stored moment of reception of a pulse advanced by a whole number of symbol transmission durations. For this, steps 41, 42, ..., 51, 52, ... are repeated for the values of the code that have not yet been associated with a pulse, by introducing at least one symbol transmission duration into the match criterion. The two pulses that occur in these steps can therefore belong to different symbol transmission sequences, and the match between the estimated and real moments of reception is sought by subtracting from the actual moment of reception at least one times the duration $T_s$ (step 59). Such a continuation of the method over a transmission duration covering several symbols can make it possible to extend certain branches of the tree of FIG. 3.

In order to increase the probability of detecting a pulse that can be associated with each code value, the detection threshold used in the step 2 (FIG. 2a) can even be adjusted throughout the method, particularly if a large number of code values have not yet been associated with pulses. The inventors have observed that, as a general rule, the number of pulses detected does not increase progressively when the detection threshold is lowered. On the contrary, several pulses often exhibit roughly identical amplitude levels, such that they are detected below one and the same threshold value. According to one interpretation, pulses having roughly identical amplitude levels follow the same propagation path between the transmitter and the receiver. The attenuation level of the radio signal then depends on the propagation path followed, and several different propagation paths are followed simultaneously. Advantageously, the detection threshold can be lowered on each adjustment so as to take into account an additional propagation path. Thus, the threshold of detection of the pulses can be lowered by successive steps so as to detect, during a symbol transmission duration, at least as many additional pulses in each lowering step as the average number of pulses used to transmit a symbol.

The count of the associations validated according to one branch of the tree is updated each time an additional association is validated for this branch. Where appropriate, this count can take into account only the validations relating to different values of the code. The synchronization method is continued until the number of validated associations of one and the same branch of the tree confers an adequate likelihood on these associations (steps 71). The moment to of the start of transmission of a symbol is then computed by using the formula (5) for this branch of the tree (step 72). The synchronization method is then finished and the receiver undertakes to decode the received symbols.

As an example, the likelihood criterion can be that the number of validated selections of different code values according to one and the same branch of the tree is greater than half the number of values contained in the code.

When the synchronization of the receiver is sought based on pulses used to code symbols, it is possible for certain frames not to include pulses for several successive symbol transmission sequences. Consequently, the code values corresponding to these unused frames cannot be associated with pulses. To avoid such circumstances leading to the synchronization method being excessively prolonged, it is advantageous to provide a preamble for each transmitted data packet, dedicated to the synchronization of the receiver, and which contains one pulse for each frame. Such a preamble makes it possible to reduce the synchronization delay on setting up the connection. It may be at least as long as a transmission sequence of two successive symbols, for example. In this case, at least some of the radio pulses used to synchronize the receiver belong to the preamble of a data packet. Where appropriate, the pulses of the preamble all correspond to one and the same state delay, measured relative to the start of the slot containing each pulse. The synchronization accuracy is then greater, given that no state delay occurs randomly when determining the moments of reception of the pulses.

It is understood that numerous modifications and adaptations can be introduced into the synchronization method that has been described in detail above. As an example, the inventors cite the following possible adaptations:

the number of pulses used to code a symbol may differ from the length of the code;

the code values used to identify a channel can be any alphanumeric symbols;

the storage of the moments of reception of pulses can be limited to the last two pulses received, by updating them each time a new pulse is received;

the storage of the moments of reception of the pulses can be replaced by a storage of time differences separating successive pulses; and steps c to e can be carried out only after the reception of the second pulse, in the same way that the steps d' and e' can be performed only after the reception of the (m+1)th pulse. In this case, the calculations needed to associate a new pulse with a code value are executed in response to the reception of the pulse.

The invention claimed is:

1. A method of synchronizing a radio receiver suitable for receiving coded symbols in the form of radio pulses, each transmitted in a predetermined time slot within a respective frame, said slot being determined by a value selected from a set of ordered values forming a code stored in the receiver, the method comprising the following steps, performed within the receiver:

a—detecting received pulses;

b—storing moments of reception of said pulses;

c—associating a first value selected from the code with a first received pulse;

d—selecting a second value from the code;

e—estimating at least one moment of reception by combining the moment of reception stored for said first received pulse with said first and second selected code values;

f—if the estimated moment matches the moment of reception stored for a second received pulse, validating the associations of said first and second code values with said first and second received pulses, otherwise repeating steps c to f by varying at least one of said first and second selected code values; and g—deducing, from at least one of the values of the code whose selection has been validated, a moment of transmission start for a symbol, wherein, in step f, the moment of reception estimated for a second received pulse matches the moment of reception stored for said second received pulse if an absolute value of a difference between the estimated and stored moments of reception for the second received pulse is less than a predetermined fraction of the duration of a time slot.

2. The method as claimed in claim 1, wherein steps c to g are executed as a background task by a processor of the receiver, and wherein step b is repeated during interruptions of the of the background task, said interruptions being triggered in response to the detection of new pulses.

3. The method as claimed in claim 1, wherein at least some of the radio pulses used to synchronize the receiver belong to a data packet preamble, said preamble having one pulse for each frame.

4. The method as claimed in claim 3, wherein the preamble is at least as long as a sequence of transmission of two successive symbols.

5. The method as claimed in claim 3, wherein the pulses of the preamble all correspond to one and the same state delay, measured relative to the start of the time slot containing each pulse.

6. The method as claimed in claim 1, wherein step a comprises the following substeps:
   a1—extracting an envelope of a received radio signal;
   a2—comparing an amplitude of the extracted envelope with a detection threshold stored in the receiver; and
   a3—if said amplitude exceeds the detection threshold, identifying the radio signal with a received pulse.

7. The method as claimed in claim 6, wherein a rising edge of an electronic signal is triggered for each received pulse, and wherein the reception moment of the pulse corresponds to the moment of the triggering of the rising edge.

8. The method as claimed in claim 6, wherein the detection threshold is adjusted so as to detect, during a duration of transmission of two successive symbols, at least as many pulses as a predetermined fraction of the number of values contained in the code.

9. The method as claimed in claim 8, wherein the detection threshold is lowered in successive steps so as to detect, during a duration of transmission of a symbol, at least as many additional pulses in each detection threshold lowering step as the average number of pulses used to transmit a symbol.

10. The method as claimed in claim 1, wherein steps c to e are repeated for several different pairs of first and second code values selected before for the second received pulse is detected, and wherein step f is executed for at least one of said pairs of first and second code values selected after the second pulse has been detected.

11. The method as claimed in claim 1, also comprising the following steps, executed after the selections of m code values have been validated, m being an integer number greater than or equal to 2:
   d'—selecting an (m+1)th value from the code;
   e'—estimating at least one moment of reception by combining the moment of reception stored for the mth received pulse with the mth and (m+1)th selected code values; and
   f'—if the estimated moment matches the moment of reception stored for an (m+1)th received pulse, validating the association of the (m+1)th code value with the (m+1)th received pulse,
      otherwise repeating steps d' to f' by varying the (m+1)th value selected of the code.

12. The method as claimed in claim 11, wherein steps d' and e' are repeated for several different code values selected as (m+1)th value before the (m+1)th pulse is detected, and wherein step f' is executed for at least one of the values selected as (m+1)th value after the (m+1)th pulse has been received.

13. The method as claimed in claim 11, wherein steps d' to f' are repeated by selecting a code value for which no association has been validated, and by searching for a match between the estimated moment of reception and a stored moment of reception of a pulse advanced by an integer number of symbol transmission durations.

14. The method as claimed in claim 1, wherein the method is continued until a series of validations is obtained that corresponds to at least half the values contained in the code.

15. A radio receiver suitable for implementing a synchronization method as claimed in claim 1.

16. A radio transmission method comprising the following steps:
   coding of the symbols in the form of pulses distributed within respective frames, each pulse being transmitted in a slot of the corresponding frame determined by a value of a code stored in a radio transmitter and in at least one radio receiver;
   transmission of the pulses by radio channel; and
   synchronization of at least one receiver by using a method as claimed in claim 1.

17. A radio transmitter suitable for implementing a transmission method as claimed in claim 16.

18. A synchronization device for a radio receiver, said receiver being suitable for receiving symbols coded in the form of radio pulses, each transmitted in a predetermined time slot within a respective frame, said slot being determined by a value selected from a set of ordered values forming a code stored in the receiver, the synchronization device comprising:
   a—means for storing moments of reception of pulses;
   b—means for selecting values from the code;
   c—means for calculating at least one second moment of reception from first and second selected code values and a first moment of reception stored for a first received pulse;
   d—means for validating associations of first and second selected code values with first and second received pulses, arranged so as to be activated if a second calculated moment of reception matches the moment of reception stored for the second received pulse; and
   e—means for determining a moment of transmission start for a symbol, suitable for determining said start moment from at least one of the code values whose selection has been validated,
wherein, in the means for validating associations, the second calculated moment of reception matches the moment of reception stored for the second received pulse if an absolute value of a difference between the calculated and stored moments of reception for the second received pulse is less than a predetermined fraction of the duration of a time slot.

* * * * *